US009056619B2

(12) United States Patent
Tran (10) Patent No.: US 9,056,619 B2
(45) Date of Patent: Jun. 16, 2015

(54) SYSTEM PROVIDING BABY BAG, BACKPACK AND STROLLER FUNCTIONALITY

(71) Applicant: Bao Quoc Tran, Westminster, CA (US)

(72) Inventor: Bao Quoc Tran, Westminster, CA (US)

( * ) Notice: Subject to any disclaimer, the term of this patent is extended or adjusted under 35 U.S.C. 154(b) by 0 days.

(21) Appl. No.: 14/033,460

(22) Filed: Sep. 21, 2013

(65) Prior Publication Data

US 2014/0091559 A1 Apr. 3, 2014

Related U.S. Application Data

(60) Provisional application No. 61/707,888, filed on Sep. 29, 2012.

(51) Int. Cl.
| | |
|---|---|
| *B62B 1/00* | (2006.01) |
| *B62B 5/00* | (2006.01) |
| *A47D 13/02* | (2006.01) |
| *A45F 3/10* | (2006.01) |
| *A45F 4/00* | (2006.01) |
| *A47D 11/00* | (2006.01) |
| *A45F 3/04* | (2006.01) |
| *B62B 7/08* | (2006.01) |
| *B62B 7/06* | (2006.01) |

(52) U.S. Cl.
CPC ............ *B62B 5/0023* (2013.01); *A47D 13/025* (2013.01); *A45F 3/10* (2013.01); *A45F 4/00* (2013.01); *A47D 11/00* (2013.01); *A45F 3/04* (2013.01); *B62B 7/08* (2013.01); *B62B 7/062* (2013.01)

(58) Field of Classification Search
CPC ............ B62B 7/00; B62B 7/004; B62B 7/04; B62B 7/06; B62B 7/08; B62B 7/062; B62B 7/086; B62B 7/10; B62B 7/12; B60N 2/2848

USPC ............... 280/648, 647, 644, 643, 30, 37, 38, 280/638, 47.38, 47.34, 658, 650, 657, 639, 280/642

See application file for complete search history.

(56) References Cited

U.S. PATENT DOCUMENTS

| | | | | |
|---|---|---|---|---|
| 4,157,837 | A * | 6/1979 | Kao | 280/30 |
| 4,586,721 | A * | 5/1986 | Harada et al. | 280/30 |
| 4,747,526 | A * | 5/1988 | Launes | 224/155 |
| 4,762,256 | A * | 8/1988 | Whitaker | 224/161 |
| 5,230,450 | A * | 7/1993 | Mahvi et al. | 224/153 |
| 5,290,049 | A * | 3/1994 | Crisp et al. | 280/30 |
| 5,653,460 | A * | 8/1997 | Fogarty | 280/642 |
| 5,662,339 | A * | 9/1997 | Svendsen et al. | 280/30 |
| 5,722,594 | A * | 3/1998 | Farr et al. | 280/643 |
| 5,779,248 | A * | 7/1998 | Gold et al. | 280/30 |
| 5,964,470 | A * | 10/1999 | Syendsen et al. | 280/30 |
| 6,220,621 | B1 * | 4/2001 | Newton | 280/650 |
| 7,163,228 | B2 * | 1/2007 | Faber | 280/651 |
| 8,020,879 | B1 * | 9/2011 | Engdahl | 280/30 |
| 8,894,089 | B2 * | 11/2014 | Clifton | 280/642 |
| 2008/0042379 | A1 * | 2/2008 | Amran | 280/30 |

* cited by examiner

*Primary Examiner* — J. Allen Shriver, II
*Assistant Examiner* — James M Dolak
(74) *Attorney, Agent, or Firm* — Plager Schack LLP (57) ABSTRACT

A system is configured to provide functionality of a stroller, a bag and a backpack to transport a child and equipment. The system has a frame with front legs, back legs and support handles connected to a central hub on the right and left sides. The push handles are each connected to an adjustable strap and a cushioned strap which can be used to carry the system as a backpack. A backrest is attached to the push handles and a seat is connected to the backrest in order to rotate the legs and handles together to be a backpack or apart to be a stroller. An upper compartment can be attached to the backrest which is used as a bag in either configuration.

9 Claims, 7 Drawing Sheets

SYSTEM PROVIDING BABY BAG, BACKPACK AND STROLLER FUNCTIONALITY

RELATED APPLICATION

This application claims priority to provisional patent application U.S. Ser. No. 61/707,888 filed on Sep. 29, 2013, the entire contents of which is herein incorporated by reference.

BACKGROUND

The embodiments herein relate generally to childcare equipment such as strollers to be used to transport small children and a baby bag used to carry essential of baby care equipment.

Prior to embodiments of the disclosed invention, prior art strollers could fold up but not into a format that could be carried easily or stored easily in an airplane's overhead compartment. Prior art strollers that were available had many moving parts used for support that could increase the weight and production complexity of the prior art stroller. As the complexity and amount of components increased so did the cost of manufacturing. Prior art baby bags store things so that a caregiver could bring essential things to care for the child but they did not supply a built in stroller. Embodiments of the disclosed invention provide a stroller-baby bag combination in a manufacturing cost efficient format and is in a user friendly format

SUMMARY

A system is configured to provide functionality of a stroller, a bag and a backpack to transport a child and equipment. The system comprises a frame further comprising a right central hub rotationally attached to a right front leg, a right rear leg and mechanically attached to a right push handle. The frame further comprising a left central hub rotationally attached to a left front leg, a left rear leg and mechanically attached to a left push handle. The frame further comprising a foot rest mechanically coupled to the right front leg and the left front leg. The frame further comprising a rear lower horizontal support mechanically coupled to the right rear leg and the left rear leg.

A left cushioned strap is mechanically coupled to the left push handle and a left adjustable strap wherein the left adjustable strap is further mechanically coupled to the left central hub. A right cushioned strap is mechanically coupled to the right push handle and a right adjustable strap wherein the right adjustable strap is further mechanically coupled to the right central hub. A backrest is mechanically coupled to the right push handle and the left push handle. A seat is mechanically coupled to the backrest. An upper compartment bag is attached to the backrest.

The right front leg, the right rear leg, left front leg and the left rear leg can be rotated into an open position moving the seat distant the backrest and enabling the child to sit on the seat permitting the system to be used as a stroller. The right front leg, the right rear leg, left front leg and the left rear leg can be rotated into a closed position moving the seat proximate the backrest permitting the system to be carried by the left adjustable strap and the right adjustable strap and thus used as the backpack. The equipment can be placed in the upper compartment bag to use the system as the bag.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
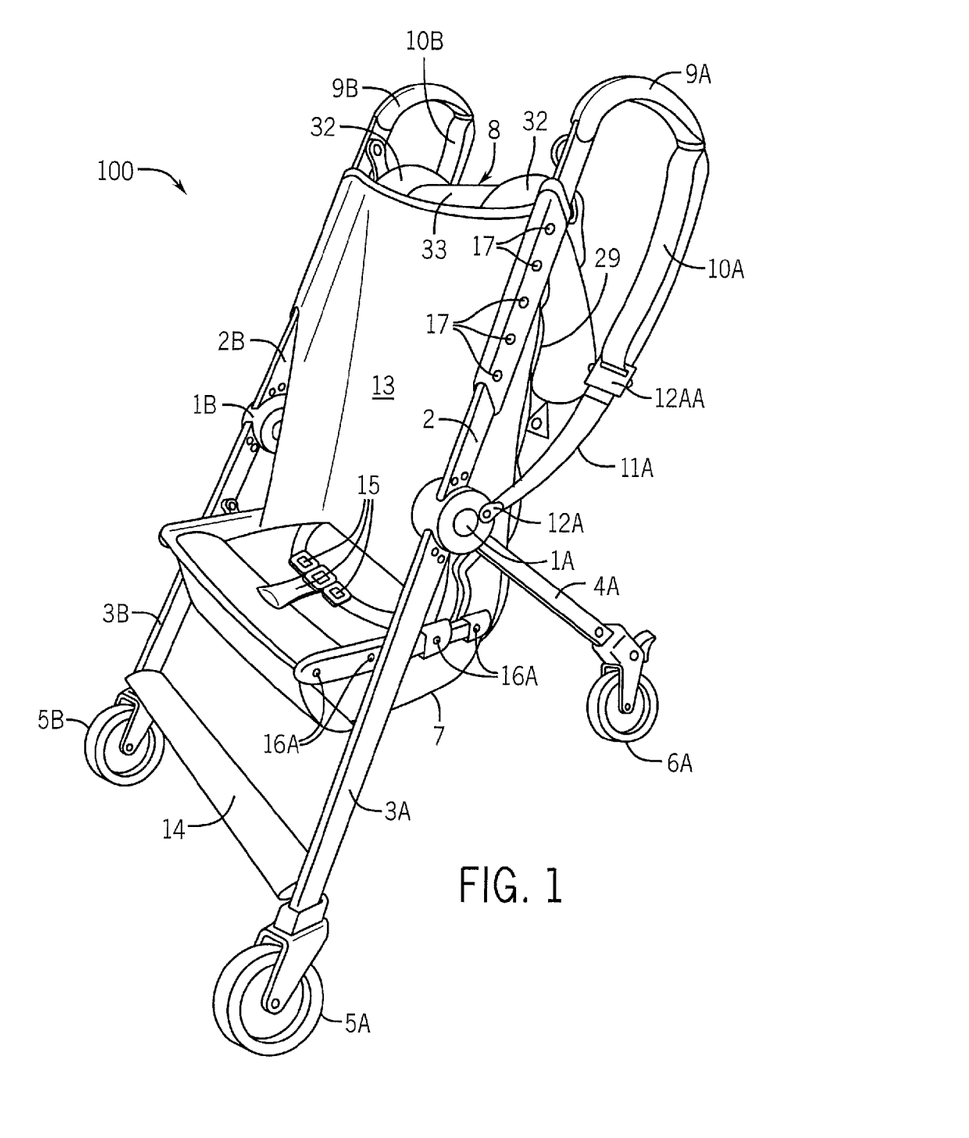
FIG. 1 is a front perspective view of an embodiment of the invention.
Figure 2:
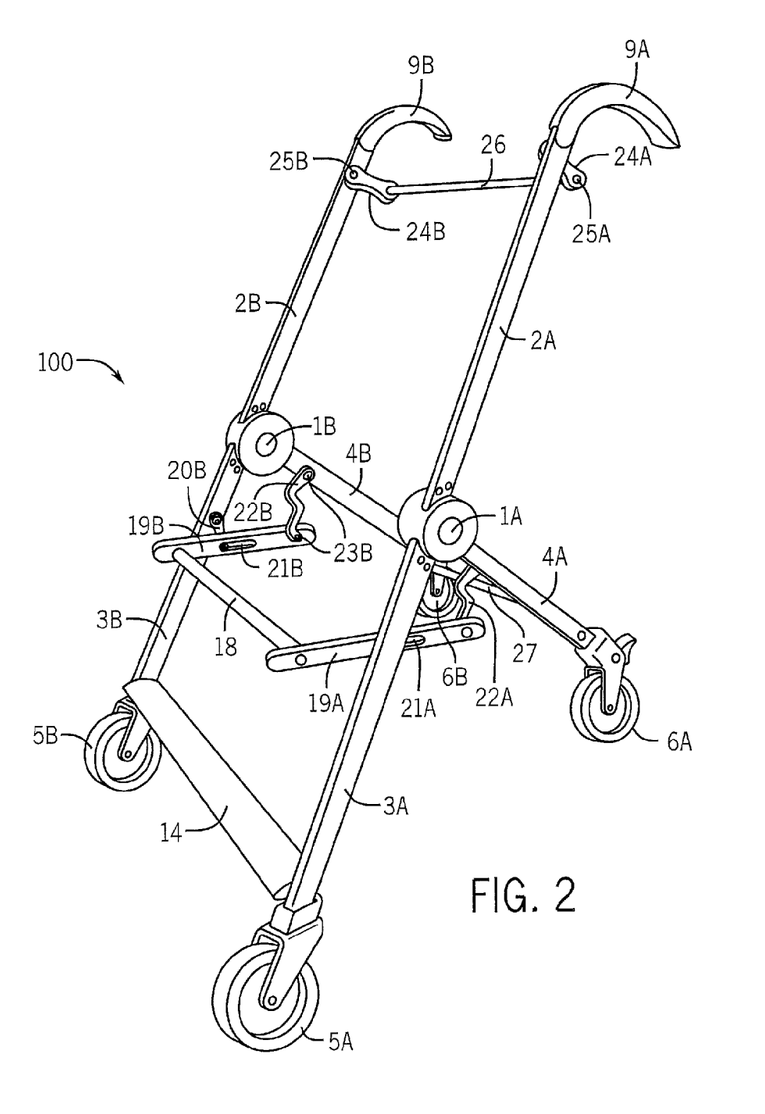
FIG. 2 is a front perspective view of an embodiment of the frame.
Figure 3A:
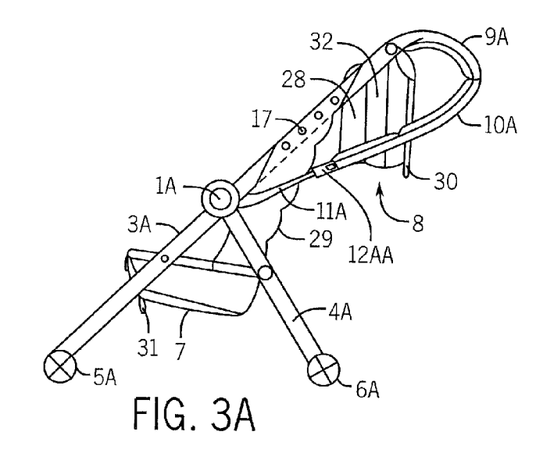
FIG. 3A-3D: are schematic side views showing the steps in converting from stroller to backpack.
Figure 3B:
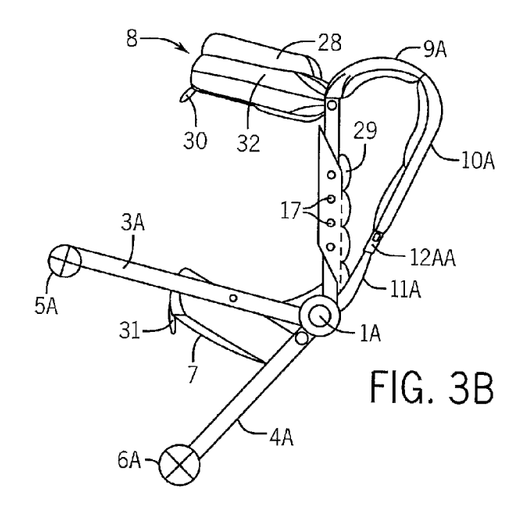
Figure 3C:
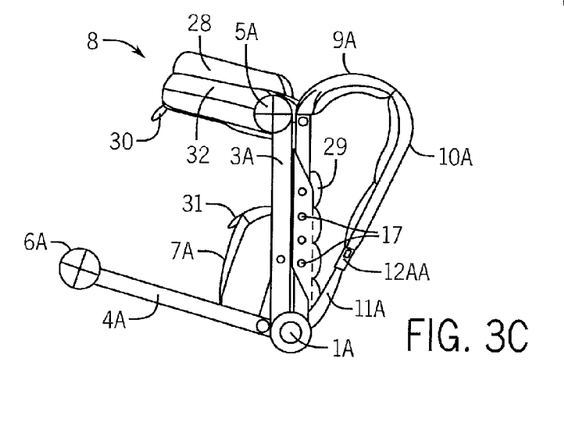
Figure 3D:
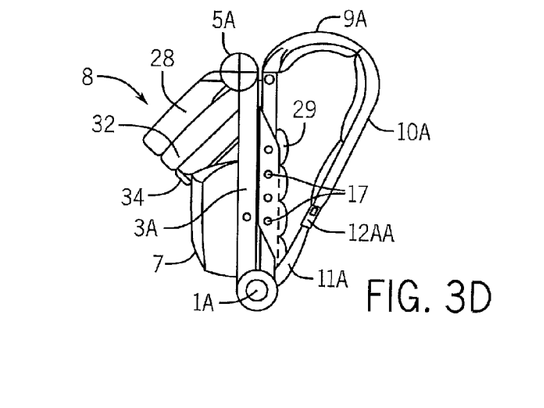

By way of example, and referring to FIG. 1 and FIG. 2, one embodiment of system 100 comprises left central hub 1A is rotationally coupled to left push handle 2A, left front leg 3A and left rear leg 4A. Left front leg 3A extends downward and terminates in left front wheel 5A. Left rear leg 4A extends downward and terminates in left rear wheel 6A.

Likewise, right central hub 1B is rotationally coupled to right push handle 2B, right front leg 3B and right rear leg 4B. Right front leg 3B extends downward and terminates in right front wheel 5B. Right rear leg 4B extends downward and terminates in right rear wheel 6B. Left front leg 3B is mechanically coupled to foot rest 14 which is further mechanically coupled to right front leg 3B. Additionally, left rear leg 4B is mechanically coupled to rear lower horizontal support 27 which is further mechanically coupled to right rear leg 4B. Left rear wheel 6A and right rear wheel 6B can be locked to prevent the system from rolling.

Left push handle 2A is rotationally coupled to left swing arm 24A with a left fastener 25A. Likewise, right push handle 2B is rotationally coupled to right swing arm 24B with a right fastener 25B. Left swing arm 24A and right swing arm 24B are mechanically coupled to handle support 26 with fasteners 25A, B.

Figure 6:
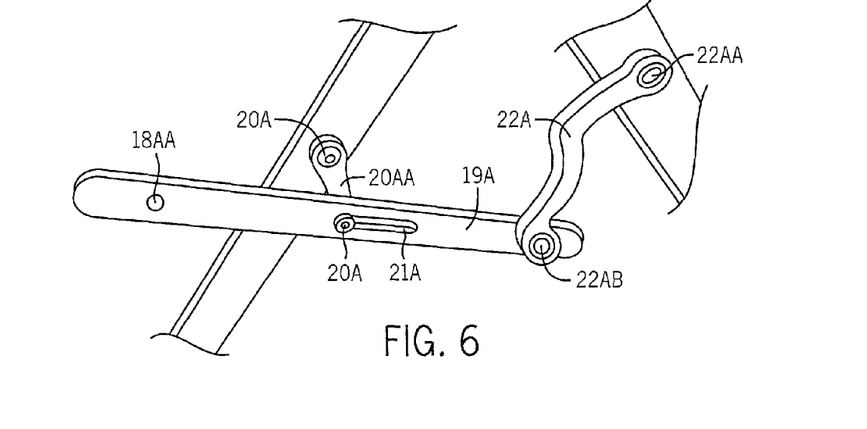
FIG. 6 is a detail perspective view of an embodiment of the invention.

As shown in more detail in FIG. 6, left front leg 3A is rotationally coupled to left front swing arm 20AA with left front upper fastener 20A. Left front swing arm 20AA is mechanically coupled to left front upper fastener 20A which rests inside left slide cut out 21A on left seat support 19A. Left seat support 19A is rotationally coupled to left rear swing arm 22A with fastener 22AB. Left rear swing arm 22A is further rotationally coupled to left rear leg 4A with fastener 22AA.

Figure 10:
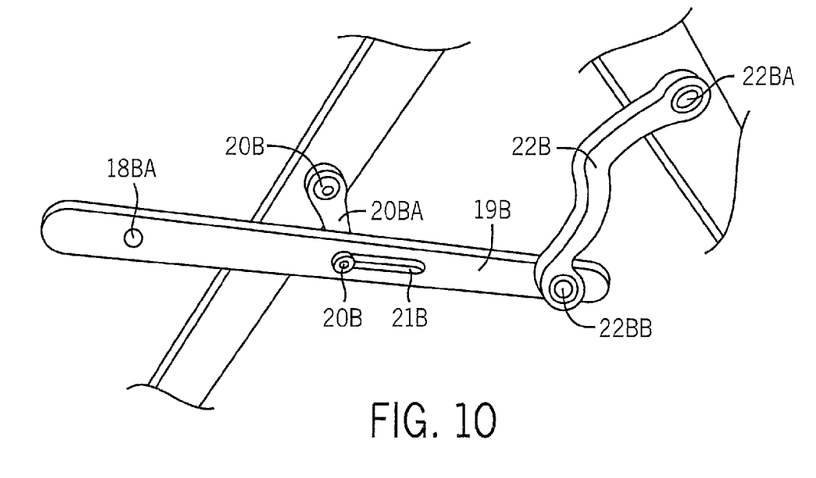
FIG. 10 is a detail perspective view of an embodiment of the invention.

Similarly, as shown in FIG. 10, right front leg 3B is rotationally coupled to right front swing arm 20BA with right front upper fastener 20B. Right front swing arm 20BA is mechanically coupled to right front upper fastener 20B which rests inside right slide cut out 21B on right seat support 19B. Right seat support 19B is rotationally coupled to right rear swing arm 22B with fastener 22BB. Right rear swing arm 22B is further rotationally coupled to right rear leg 4B with fastener 22BA. Left seat support 19A is mechanically coupled to right seat support 19B by seat horizontal support 18.

Left central hub 1A is mechanically coupled to left adjustable strap 11A. Left adjustable strap 11A, having left adjuster 12AA, is further attached to left cushioned strap 10A. Left cushioned strap 10A is attached to left cushioned push handle 9A. Left push handle grip 9A covers a portion of left push handle 2A. Similarly, right central hub 1B is mechanically coupled to right adjustable strap 11B. Right adjustable strap 11B, having right adjuster, is further attached to right cushioned strap 10B. Right cushioned strap 10B is attached to right cushioned push handle 9B. Right push handle grip 9B covers a portion of right push handle 2B.

Left push handle 2A and right push handle 2B are mechanically coupled to backrest 13 by attachments 17. Backrest 13 is further mechanically coupled to upper compartment bag 8 and safety strap 15. Backrest 13 is further mechanically coupled to seat 7.

Turning to FIGS. 3A-3D, upper compartment bag 8 comprises smaller compartment bag 28. Smaller compartment bag 28 is connected to left cylindrical shaped compartment 32 and right cylindrical shaped compartment 32. Smaller compartment 28 is configured to accommodate handy wipes, diapers, or snacks. Cylindrical shaped compartment 32 can accommodate drinks. Upper compartment bag 8 is attached to upper compartment bag button strap 30 that can be used to close the stroller into a backpack as shown. Seat 7 is mechanically coupled to sectional pieces 29 wherein sectional pieces 29 can house foam cushions for the seat and backpack. Seat 7 is further mechanically coupled to seat button strap 31. Holistically, all of the material that could possibly be stored in any of these compartments is called "equipment."

Figure 4:
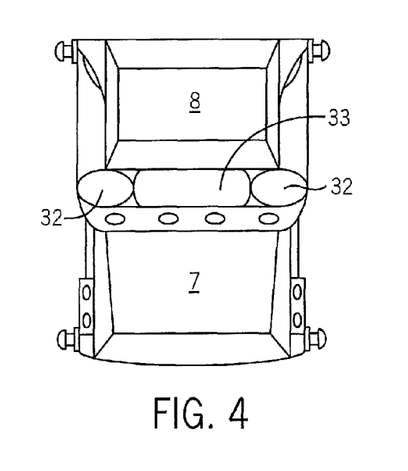
FIG. 4 is a detail top view of an embodiment of the invention.
Figure 5:
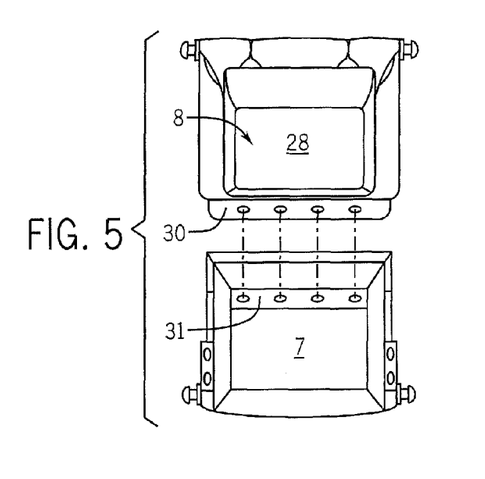
FIG. 5 is a detail exploded top view of an embodiment of the invention.

To fold system 100 into a backpack from a stroller, a user rotates left front leg 3A about left central hub 1A until left front leg 3A is parallel to left push handle 2A. The user then rotates right front leg 3B about right central hub 1B until right front leg 3B is parallel to right push handle 2B. The user then rotates left rear leg 4A about left central hub 1A until left rear leg 4A is parallel to left push handle 2A. The user then rotates right rear leg 4B about right central hub 1B until right rear leg 4B is parallel to right push handle 2B. Finally, as shown in FIG. 4 and FIG. 5, the user joins upper compartment bag button strap 30 to seat button strap 31.

Figure 7:
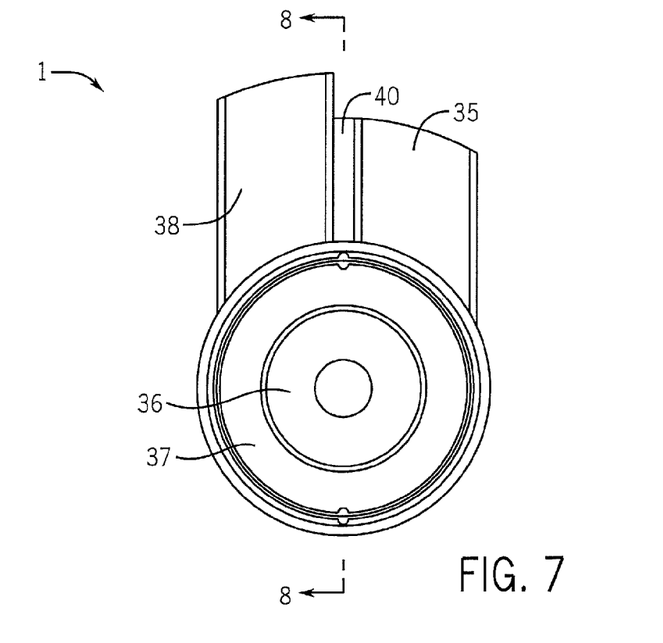
FIG. 7 is a detail elevation view of the hub.
Figure 8:
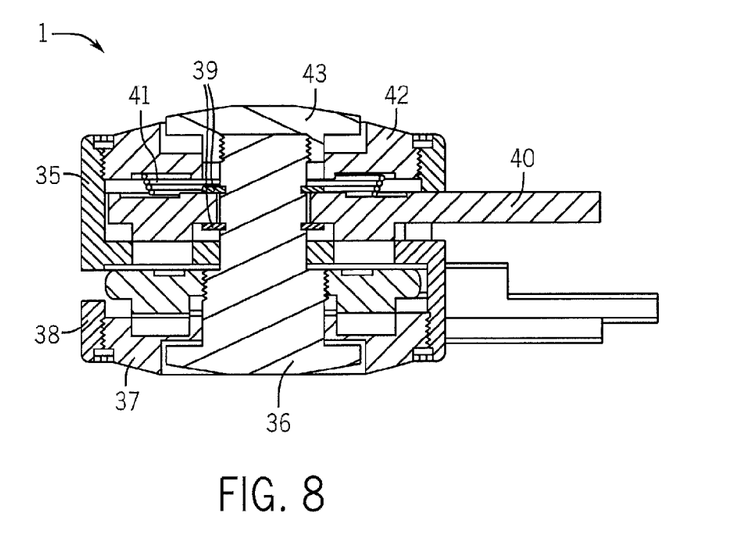
FIG. 8 is a cross-sectional view taken on line 8-8 of FIG. 7.
Figure 9:
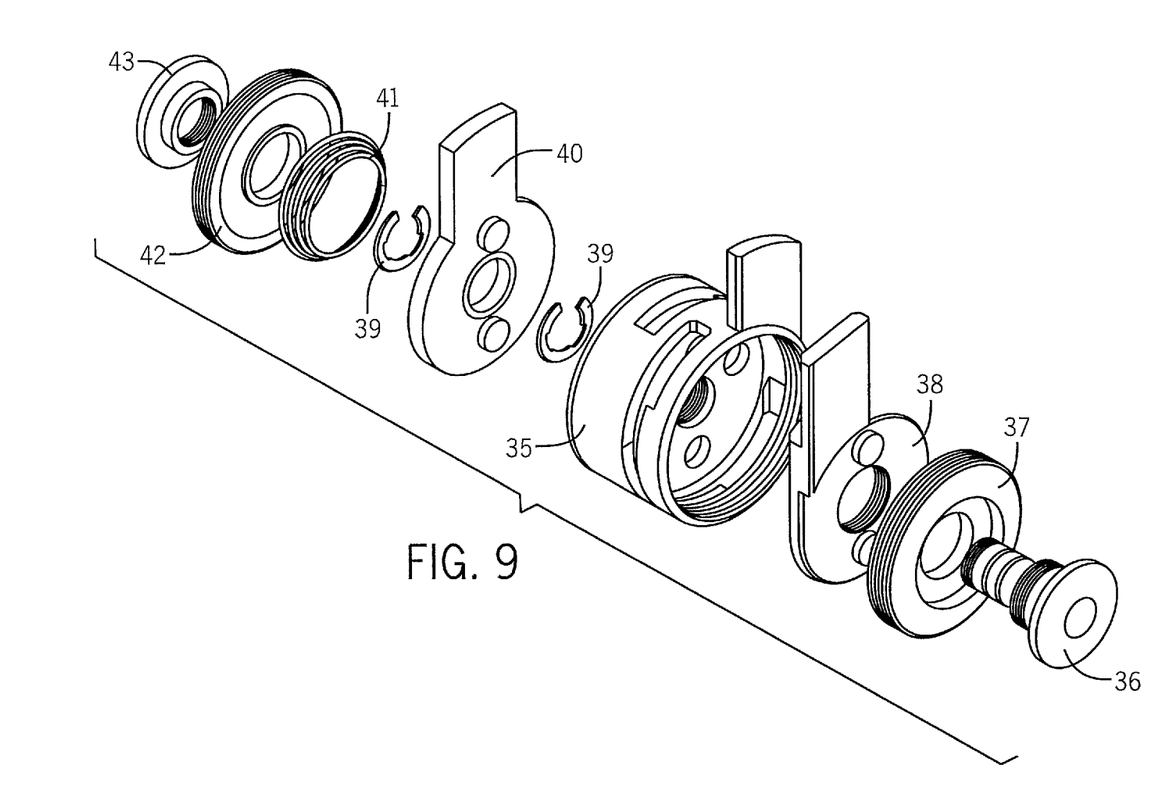
FIG. 9 is an isometric view of the hub with its individual parts exposed.

One of the unique features of the present invention which facilitates such simple folding is central hub 1 which is shown in more detail in FIG. 7, FIG. 8 and FIG. 9. Central Hub 1 is responsible for the manipulation of the stroller/sports seat from stroller/sports seat to backpack configurations. Central hub 1 comprises central axis nut 36. Central axis nut 36 slides through front lock 37. Front lock 37 is immediately adjacent to outer arm 38. Outer arm 38 can fit inside and partially rotate in an outer slot on hub assembly 35. Likewise, inner arm 40 can fit inside and partially rotate in an outer slot on hub assembly 35. Inner arm 40 is immediately adjacent to an inner retainer ring 39 and an outer retainer ring 39. Retainer rings 39 hold inner arm 40 in place while allowing hub assembly 35 and outer arm 38 to freely rotate. Inner arm 40 is immediately adjacent to spring 41. Spring 41 place tension against the components to push the male components into the female components to maintain positive pressure in locking positions of the pieces of central hub 1. Spring 41 is immediately adjacent to rear lock 42. Rear lock 42 is immediately adjacent to cap 43. Cap 43 can be threaded onto central axis nut 36 to hold the central hub components together.

To use central hub 1, front leg 3 can be attached to outer arm 38. Push handle 2 can be attached to hub assembly 35. Rear leg 4 can be attached to inner arm 40. Hub assembly 35 is configured such that outer arm 38 can rotate from and be locked into an open position, which is useful when system 100 is used as a stroller. Outer arm 38 can be pressed into a channel from the open position and rotated into a closed position which is useful when system 100 is used as a backpack. Hub assembly 35 is further configured such that inner arm 40 can rotate from and be locked into an open position, which is useful when system 100 is used as a stroller. Inner arm 40 can be pressed into a channel from the open position and rotated into a closed position which is useful when system 100 is used as a backpack.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system configured to provide functionality of a stroller, and a bag to transport a child and equipment; the system comprising
   a frame further comprising:
       a right central hub rotationally attached to a right front leg, a right rear leg and mechanically attached to a right push handle;
       a left central hub rotationally attached to a left front leg, a left rear leg and mechanically attached to a left push handle;
       a foot rest mechanically coupled to the right front leg and the left front leg;
       a rear lower horizontal support mechanically coupled to the right rear leg and the left rear leg;
   a left cushioned strap mechanically coupled to the left push handle and a left adjustable strap wherein the left adjustable strap is further mechanically coupled to the left central hub;
   a right cushioned strap mechanically coupled to the right push handle and a right adjustable strap wherein the right adjustable strap is further mechanically coupled to the right central hub;
   a backrest mechanically coupled to the right push handle and the left push handle;
   a seat mechanically coupled to the backrest; and
   an upper compartment bag attached to the backrest;
   wherein the right front leg, the right rear leg, left front leg and the left rear leg is configured to be rotated into an open position moving the seat distant the backrest and enabling the child to sit on the seat permitting the system to be used as a stroller;
   wherein the right front leg, the right rear leg, left front leg and the left rear leg is configured to be rotated into an closed position moving the seat proximate the backrest permitting the system to carried by the left adjustable strap and the right adjustable strap and thus configured to be carried on a human user's back;
   wherein the equipment can be placed in the upper compartment bag to use the system as the bag;
   a left front swing arm rotationally coupled to the left front leg;
   a left front upper fastener mechanically coupled to the left front swing arm and resting inside a left slide cut out on a left seat support;
   a left rear swing arm rotationally coupled to the left seat support and to the left rear leg;

a right front swing arm rotationally coupled to the right front leg;
a right front upper fastener mechanically coupled to the right front swing arm and resting inside a right slide cut out on a right seat support;
a right rear swing arm rotationally coupled to the right seat support and to the right rear leg; and
a seat horizontal support mechanically coupled to the left seat support and the right seat support
wherein a user can mechanically couple the seat to the left seat support and the right seat support which facilitates folding the system into the closed position.

2. The system of claim 1, further comprising
a left swing arm rotationally coupled to the left push handle;
a right swing arm rotationally coupled to the right push handle; and
a handle support mechanically coupled to the left swing arm and the right swing arm;
wherein the handle support provides support for the upper compartment bag.

3. The system of claim 1, wherein the right central hub and the left central hub further comprise:
a central axis nut immediately adjacent to a front lock, an outer arm, a hub assembly, an inner arm a spring a rear lock and a cap;
wherein the spring places tension on the outer arm and the inner arm into the hub assembly to maintain positive pressure in the open position or the closed position of the left central hub or the right central hub.

4. The system of claim 1, further comprising
a left front wheel mechanically coupled to the left front leg;
a left rear wheel mechanically coupled to the left rear leg;
a right front wheel mechanically coupled to the right front leg; and
a right rear wheel mechanically coupled to the right rear leg;
wherein the left rear leg and the right rear leg can be locked to prevent the system from rolling.

5. The system of claim 1, wherein
the upper compartment bag comprises a smaller compartment bag; and
the smaller compartment bag is connected to a left cylindrical shaped compartment and a right cylindrical shaped compartment;
wherein the smaller compartment bag is configured to accommodate handy wipes, diapers, or snacks
wherein the right cylindrical shaped compartment and the left cylindrical shaped compartment are configured to accommodate drinks.

6. A system configured to provide functionality of a stroller, and a bag to transport a child and equipment; the system comprising
a frame further comprising:
a right central hub rotationally attached to a right front leg, a right rear leg and mechanically attached to a right push handle;
a left central hub rotationally attached to a left front leg, a left rear leg and mechanically attached to a left push handle;
a foot rest mechanically coupled to the right front leg and the left front leg;
a rear lower horizontal support mechanically coupled to the right rear leg and the left rear leg;
a left cushioned strap mechanically coupled to the left push handle and a left adjustable strap wherein the left adjustable strap is further mechanically coupled to the left central hub;
a right cushioned strap mechanically coupled to the right push handle and a right adjustable strap wherein the right adjustable strap is further mechanically coupled to the right central hub;
a backrest mechanically coupled to the right push handle and the left push handle;
a seat mechanically coupled to the backrest; and
an upper compartment bag attached to the backrest;
wherein the right front leg, the right rear leg, left front leg and the left rear leg is configured to be rotated into an open position moving the seat distant the backrest and enabling the child to sit on the seat permitting the system to be used as a stroller;
wherein the right front leg, the right rear leg, left front leg and the left rear leg is configured to be rotated into an closed position moving the seat proximate the backrest permitting the system to carried by the left adjustable strap and the right adjustable strap and thus configured to be carried on a human user's back;
wherein the equipment can be placed in the upper compartment bag to use the system as the bag;
wherein the right central hub and the left central hub further comprise:
a central axis nut immediately adjacent to a front lock, an outer arm, a hub assembly, an inner arm a spring a rear lock and a cap; and
wherein the spring places tension on the outer arm and the inner arm into the hub assembly to maintain positive pressure in the open position or the closed position of the left central hub or the right central hub.

7. The system of claim 6, further comprising
a left swing arm rotationally coupled to the left push handle;
a right swing arm rotationally coupled to the right push handle; and
a handle support mechanically coupled to the left swing arm and the right swing arm;
wherein the handle support provides support for the upper compartment bag.

8. The system of claim 6, further comprising
a left front wheel mechanically coupled to the left front leg;
a left rear wheel mechanically coupled to the left rear leg;
a right front wheel mechanically coupled to the right front leg; and
a right rear wheel mechanically coupled to the right rear leg;
wherein the left rear leg and the right rear leg can be locked to prevent the system from rolling.

9. The system of claim 6, wherein
the upper compartment bag comprises a smaller compartment bag; and
the smaller compartment bag is connected to a left cylindrical shaped compartment and a right cylindrical shaped compartment;
wherein the smaller compartment bag is configured to accommodate handy wipes, diapers, or snacks
wherein the right cylindrical shaped compartment and the left cylindrical shaped compartment are configured to accommodate drinks.

* * * * *